April 22, 1930. L. GENDLER 1,755,921
BAGLE FORMING MACHINE
Filed Feb. 27, 1929  4 Sheets-Sheet 1
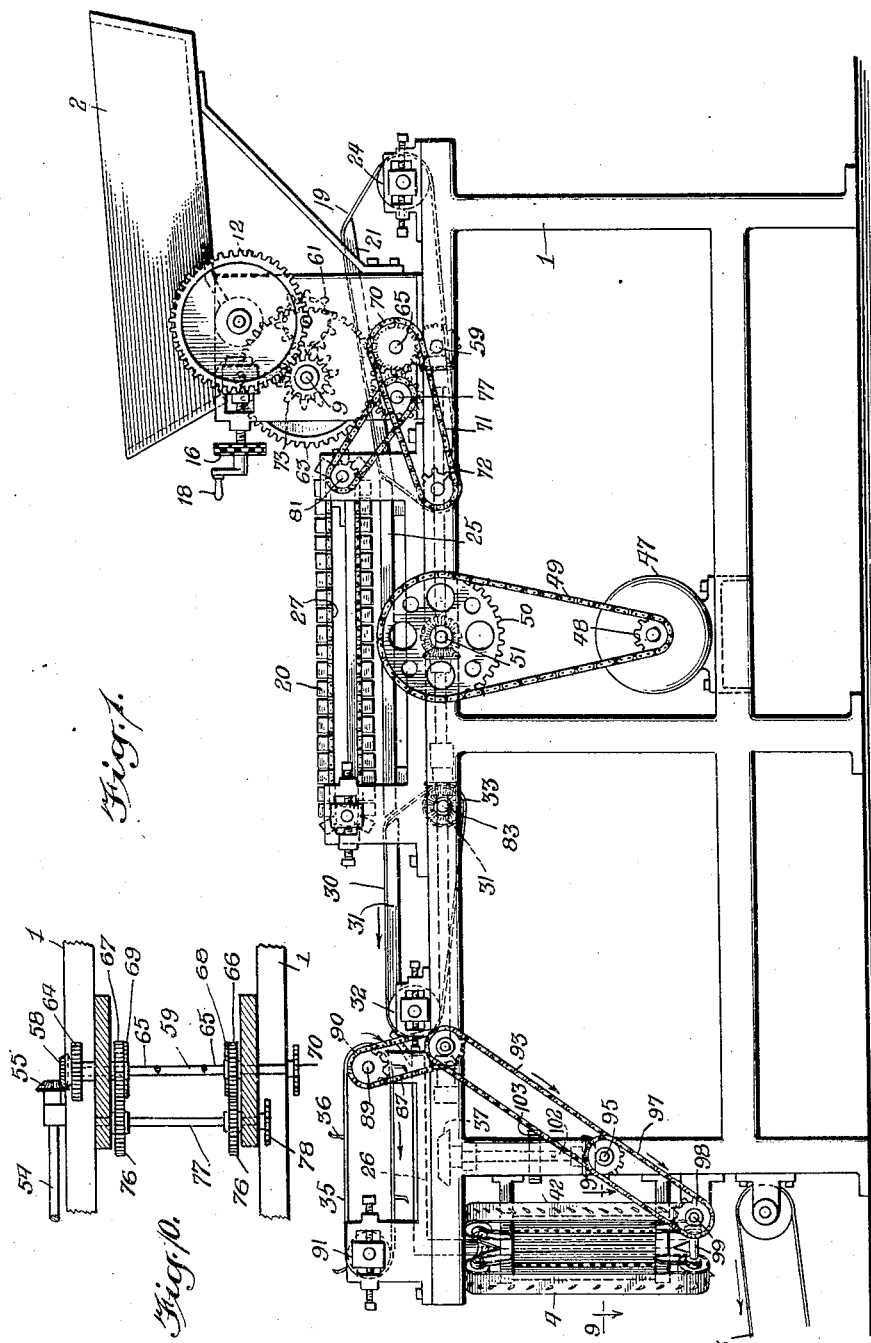
WITNESSES
INVENTOR
Louis Gendler
BY
ATTORNEY

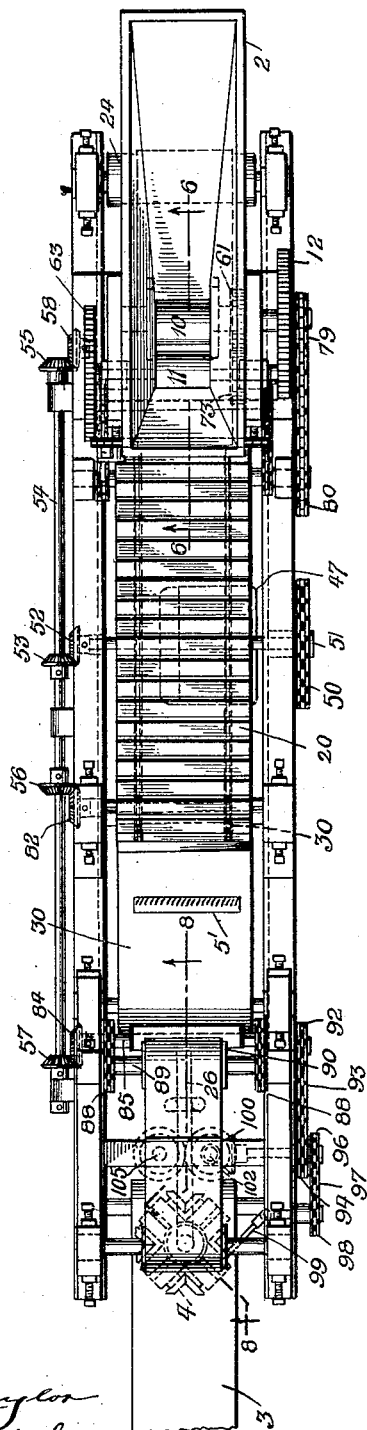

April 22, 1930.  L. GENDLER  1,755,921
BAGLE FORMING MACHINE
Filed Feb. 27, 1929  4 Sheets-Sheet 3
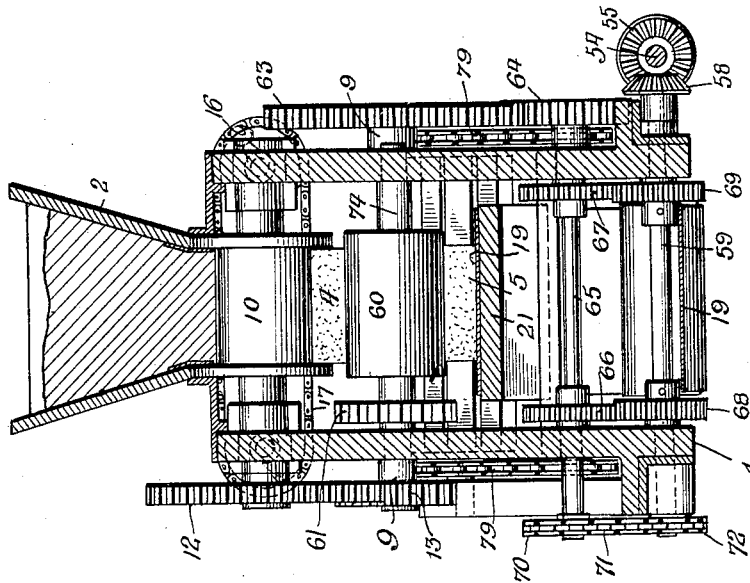
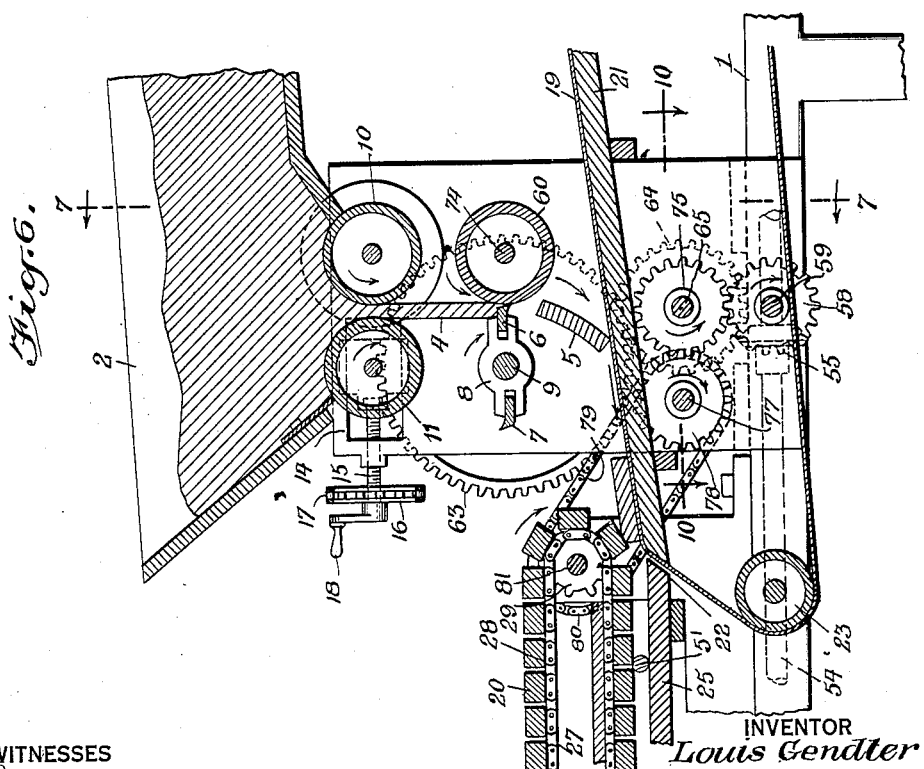
WITNESSES
INVENTOR
Louis Gendler
BY
ATTORNEY April 22, 1930. L. GENDLER 1,755,921
BAGLE FORMING MACHINE
Filed Feb. 27, 1929 4 Sheets-Sheet 4
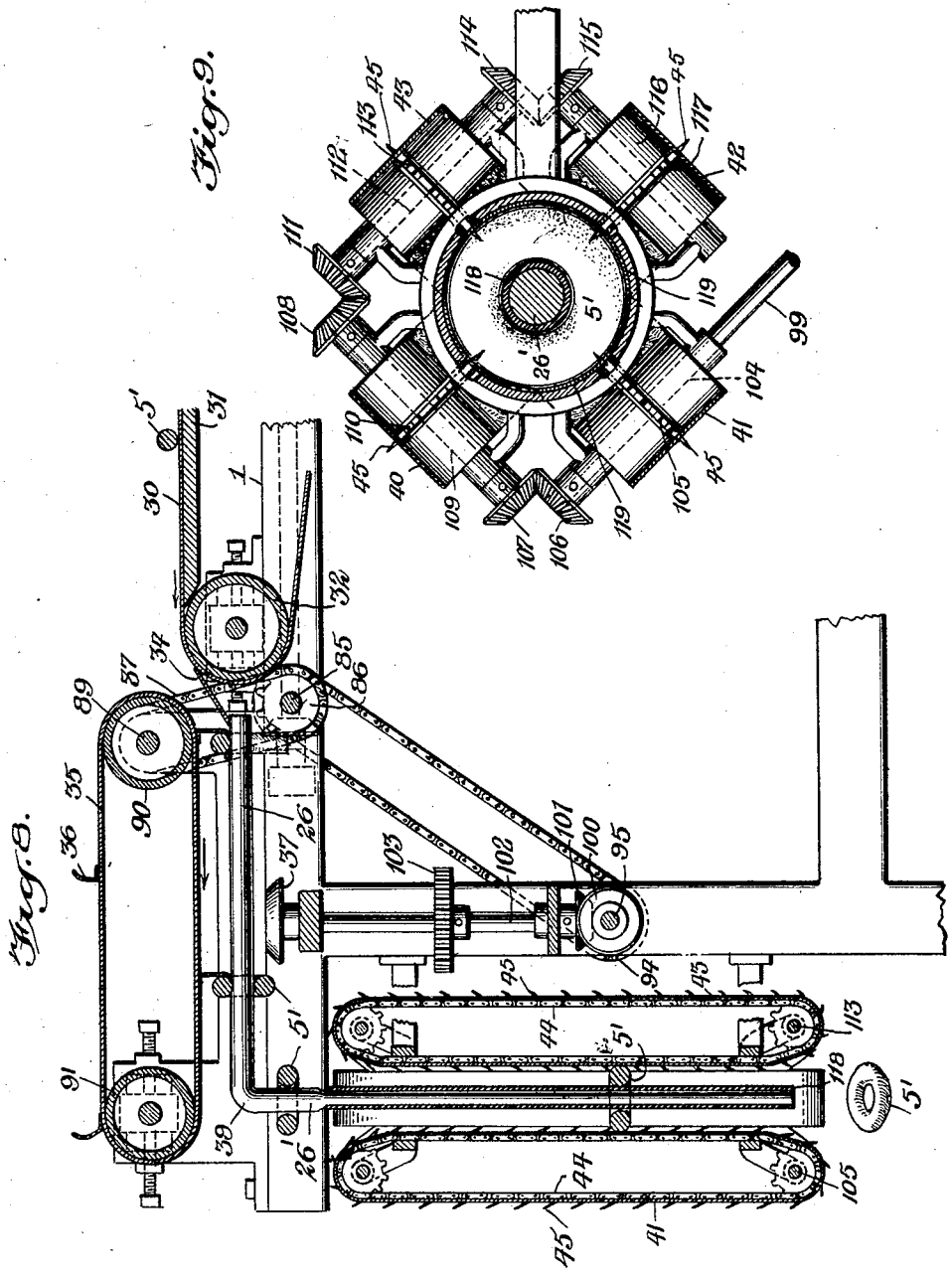
WITNESSES
INVENTOR
Louis Gendler
BY
ATTORNEY Patented Apr. 22, 1930

1,755,921

UNITED STATES PATENT OFFICE

LOUIS GENDLER, OF NEW YORK, N. Y.

BAGLE-FORMING MACHINE

Application filed February 27, 1929. Serial No. 343,036.

This invention relates to an improved machine for forming bread rings commonly known as "bagles," the object being to provide a machine wherein a ring of dough may be formed quickly and accurately without the dough touching the operator's hand.

Another object of the invention is to provide an improved machine wherein dough is fed to the machine at one end and the dough is variously treated by the mechanism until it emerges in successive rings ready for the cooking operation.

A still further object, more specifically, is to provide a machine for receiving a batch of dough, forming the same into strips, cutting the strips into sections and rolling the sections into rings ready to be cooked, the entire treatment of the dough being automatic from the time it enters the machine until the time it leaves the machine.

In the accompanying drawings,—

Figure 1 is a side view of the machine disclosing an embodiment of the invention;

Figure 2 is a top plan view through the structure shown in Figure 1;

Figure 3 is a detail fragmentary view showing the rolled dough as it is deposited on the forming bar;

Figure 4 is a view similar to Figure 3 but showing the dough further advanced on the forming bar and positioned readily for having the ends connected;

Figure 5 is a view similar to Figure 4 but showing the dough completely formed into a ring;

Figure 6 is a sectional view through Figure 2 on line 6—6, the same being on an enlarged scale;

Figure 7 is a sectional view through Figure 6 on the line 7—7;

Figure 8 is a fragmentary sectional view through Figure 2 on the line 8—8, the same being on an enlarged scale;

Figure 9 is an enlarged detail sectional view through Figure 1 on the line 9—9.

Figure 10 is a fragmentary sectional view through Figure 6 on the line 10—10.

Referring to the accompanying drawings by numerals, 1 indicates a frame of any desired kind, preferably of metal and provided with suitable braces so as to properly support the various moving parts and stationary parts hereinafter fully described. On the frame 1 is mounted a hopper or magazine 2 and into this is placed a suitable batch of dough which is acted on by means hereinafter fully described for forming comparatively small rings of dough and finally discharging the completed rings onto the belt 3 which transports the dough rings to a desired point. In forming bread rings known as "bagles" it has been customary heretofore to have two men take prepared dough and form the rings by hand. After this has been done a third man takes the rings and places them in boiling water for a certain time and finally removes the boiled rings from the water so that the final cooking may be done in an oven. In this way the bagles are partly cooked in hot water and partly in a baking oven, whereby the proper cooking action is secured and a certain desired flavor is produced. In the present instance the machine disclosed in the drawings takes the place of the two men forming the rings so that only one man is necessary, namely, the one who places the dough rings into water and into the oven. It will be understood, of course, that from time to time the single workman must supply a new batch of dough to the hopper 2. This dough is formed by a well-known recipe and must be prepared before the ring-forming opeartion takes place. When a batch of dough has been placed in the hopper 2, as shown in Figure 6, and the machine started a web 4 will be provided which is severed into lengths 5 by the knives 6 and 7 carried by the rotary holder 8 rigidly secured to shaft 9. The rollers 10 and 11 act as forming or squeezing rollers, whereby the web 4 is produced, roller 10 being rigidly secured to the gear wheel 12 (Figure 1) and said gear wheel in turn meshing with the pinion 13 rigidly secured to shaft 9. The opposite roller 11 is supported by suitable bearing boxes carried in the frame 14 (Figure 6) and these boxes are moved so that roller 11 may move toward or from roller 10. The movement of these boxes is caused by the screws 15, each screw having a sprocket wheel 16, said sprocket wheels being connected by chain 17. One of the screws 15 is provided with a crank 18, whereby, if desired, adjustment may be secured at any time for varying the thickness of the web 4. When the machine is once set and the power turned off roller 10 will continue to rotate and also roller 11 which is loosely mounted. This continuous operation of the rollers will gradually move the dough downwardly into web 4 and this web is cut off from time to time, as just described. The cut section 5 falls on a traveling seat or belt 19 and is forced beneath the forming belt 20. Belt 19 passes over a platform 21 and at one point through a slot or opening 22 so that it may move over the roller 23 and thence to roller 24 and then over the end of the platform 21, as shown in Fig. 1. This endless belt or conveyor is continually moving during the operation of the machine so that the successive sections 5 are brought into engagement with the belt so as to be formed thereby. As these sections are engaged by belt 20 they are rolled over the plate or surface 25, whereby a round or cylindrical form is produced so that the section 5 will present a cylindrical member 5', as shown in Fig. 3. This cylindrical member is moved over the forming rod 26 and is acted on by certain means hereinafter fully described. The forming belt 20 is preferably formed from an endless chain 27 having a plurality of blocks 28 connected therewith, said chain passing over the respective sprockets 29 and 30. The blocks 28 when in action engage the sections 5 and move these sections over the bore 25, and in doing so roll these sections over and over until the cylindrical form 5' is formed, as shown in Figs. 2 and 3. The forming belt 20 discharges these cylindrical members onto a smooth belt or conveyor 30 which is mounted to pass over and contact with a stationary platform 31. This conveyor is supported by suitable drums 32 and 33 which are driven through sprocket wheels and other members as hereinafter fully described. As the cylindrical roller 5' is discharged onto this conveyor by the forming belt 20, this conveyor acts to continually move the cylindrical member or section 5' until it moves onto the forming rod 26. As shown in Fig 6, the section 5' of dough moves off the conveyor 30 as the conveyor passes over the drum 32. This section passes by gravity over a guiding apron 34 until it strikes the forming rod 26. As it passes rather rapidly down the inclined apron 34 it strikes the rod 26 with some appreciable force, and consequently, the ends will immediately bend downwardly under their own weight, as shown in Figure 4. In order that this U-shaped section 5' may be formed into a ring and may be moved forwardly a pusher belt 35 is pushed as shown in Fig. 8. This belt carries a number of pushing blades 36 which engage the U-shaped section 5' substantially at the center and forces the section along the rod 26 and past the forming disks 37 and 38. The disks 37 and 38 are rotated at a comparatively high rate of speed by means hereinafter more fully described, whereby when the ends of the U-shaped member 5' engage these disks they will be given a movement toward each other until the ring is formed as shown in Fig. 5 and is forced past the disks by one of the blades 36. The blades 36 act to force the substantially finished ring to a point over the bend 39 (Fig. 8) and the ring will then move under the action of gravity downwardly over the rod extension 26'. The substantially finished ring will first drop under the action of gravity and then be engaged by the various belts 40, 41, 42 and 43 and be forcibly moved downwardly over extension 26'. This movement caused by the belts also permits the belts to complete the forming of the ring. Preferably each belt is provided with a chain 44 and each chain is preferably provided with a number of very small pins 45 adapted to project into the ring to positively force the ring downwardly as the belts move. A completely formed ring of dough is finally discharged off the ends of the extension 26' and drops from the end of this extension under the action of gravity onto the conveyor 3 which automatically conveys the ring to a desired point. In order to drive the various moving parts heretofore described any suitable source of power may be used, as for instance, the electric motor 47 (Fig. 1). A pinion 48 is connected with the armature of motor 47 so that the chain 49 passing over sprocket wheel 48 may be driven, said chain also passing over a sprocket wheel rigidly secured to the transversely-extending shaft 51. This shaft carries a beveled gear 52 (Fig. 2) at the opposite end, said beveled gear meshing with the beveled gear 53 rigidly secured to the jack shaft 54. Shaft 54 also carries beveled gears 55, 56 and 57. It will be noted that all of these beveled gears continually rotate when the machine is in operation, and consequently the various moving parts are driven at a proper relative speed. The beveled gear 55 meshes with the beveled gear 58, said beveled gear 58 being rigidly secured to the shaft 59 and said shaft 59 carrying gear wheels 68 and 69, as shown in Fig. 7. These last two gear wheels mesh with the respective gear wheels 66 and 67 rigidly secured to shaft 65. Shaft 65 extends through the framework 1 and carries a sprocket wheel 70 which accommodates the chain 71, said chain passing over a sprocket wheel 72, as shown in Fig. 1. The sprocket wheel 72 is rigidly connected in any desired manner with the drum 23 (Fig. 6), whereby the conveyor 19 is driven. Shaft 65 not only extends through the frame 1 for receiving the sprocket 70, but extends through the opposite side of the frame for receiving the gear wheel 64 which continually meshes with the large gear wheel 63, and as this large gear wheel is rigidly secured to shaft 9 the knives 6 and 7 are caused to function properly. In addition, shaft 9 has a gear wheel 73 which continually meshes with the gear wheel 61 rigidly secured to the shaft 74, which shaft in turn is rigidly secured to the drum or roller 60 which coacts with the knives 6 and 7 for cutting the web 4. It will be noted from Figs. 1 and 7 that the large gear wheel 12 meshes with the pinion 13, which pinion is rigidly secured to shaft 9, whereby power is transmitted to the drum 10. Shaft 65 carries gear wheels 66 and 67, as shown in Figs. 6 and 10, said gear wheel meshing with gear wheels 76 rigidly secured to the shaft 77. Shaft 77 has a sprocket wheel 78 rigidly secured thereto, said sprocket wheel accommodating chain 79, and said chain in turn passing over a suitable gear wheel 80 secured to shaft 81. Shaft 81 is rigidly secured to sprocket wheel 29 (Fig. 6) which carries the chain 27 of the forming belt 20. By this means the forming belt is properly driven so as to function as heretofore set forth.

From Fig. 2 it will be seen that the beveled gear 56 secured to shaft 54 continually meshes with the beveled gear 82 which is secured to shaft 83, and said shaft in turn is secured to the drum 33 over which the conveyor 30 passes. As the conveyor 30 is driven by the drum 33 the opposite or coacting drum 32 is preferably an idler and may be provided with adjusting bearing blocks to take up the slack.

Shaft 54, as shown in Fig. 2, carries the beveled gear 57 which continually meshes with the beveled gear 84 and said beveled gear 84 is rigidly secured to shaft 85, which shaft carries two sprocket wheels 86 and these sprocket wheels in turn each carry a chain 87, said chains passing over the respective sprocket wheels 88 rigidly secured to the shaft 89. Shaft 89 is rigidly secured in any desired manner to the drum 90 on which the pusher belt is mounted. The opposite end of the pusher belt is mounted on the idler drum 91 which is supported by suitable adjustable bearings whereby the belt may be maintained taut. Shaft 85, in addition to the gear wheels heretofore mentioned, carries a gear wheel 92 and this last gear wheel accommodates the chain 93, which chain passes over sprocket wheel 94. The sprocket wheel 94 is rigidly secured to a shaft 95 and this shaft carries a sprocket wheel 96 accommodating the chain 97. Chain 97 passes over sprocket wheel 98 secured to the shaft 99 (Figs. 1 and 9). Shaft 95 has a beveled gear 100 rigidly secured thereto and said gear is continually in mesh with the beveled gear 101 secured to shafts 102. This shaft extends upwardly through suitable guides and carries the forming disk 37. In addition, shaft 102 carries a gear 103 which continually meshes with gear 104 rigidly secured to shaft 105. Shaft 105 (Fig. 4) carries the forming disk 38. By receiving power in this way the forming disks are rotated in proper time to the movement of the section 5', whereby the section is almost completely formed, as illustrated in Fig. 5. This action takes place without stopping the movement of the section or ring along the forming rod 26. From Figure 5 it will be noted that a small, or rather, short point is provided but this is eliminated as the ring passes downwardly over the rod section 26'. At the same time that power is transmitted to the forming disks 37 and 38 power is also transmitted through shaft 99 and associated parts to the various belts 40 to 43 inclusive, as shown in Fig. 9. As illustrated in this figure, shaft 99 is connected with the roller 104 which carries a sprocket wheel 105. Shaft 99 is also provided with a beveled gear 106 continually meshing with the beveled gear 107 connected to a shaft carrying beveled gear 108, roller or drum 109 and sprocket wheel 110. Beveled gear 108 continually meshes with beveled gear 111 secured to a shaft carrying the drum 112, sprocket wheel 113 and beveled gear 114. The beveled gear 114 is continually in mesh with beveled gear 115, which latter gear is rigidly secured to the drum 115 and to the sprocket wheel 116. By the construction just described power is transmitted to the various belts 40 to 43 inclusive, whereby they are caused to function in proper time and in turn cause the chains 44 and the pointed members 45 to function also. As indicated particularly in Fig. 9, a canvas covering 118 surrounds the section 26' and the metallic tube 119 surrounds the tube 118 but is spaced therefrom so as to make a guideway which will round the bagle before it is discharged. The tube 119 is really not a complete tube but is four arc-shaped sections separated by the chains 44. As the bagle is forced down this passageway it takes a ring-shaped formation both inside and outside and the small indentations made by the spurs 45 quickly disappear after the dough bagle has been released.

What I claim is:—

1. A bagle-forming machine, including a hopper for receiving dough, means for converting the dough into small sections for batches, means for receiving said small batches and re-forming the same to produce cylindrical members, a forming rod for receiving said cylindrical members, a pair of forming disks coacting with said rod for converting said cylindrical members into rings, and means coacting with said forming rod for completing the formation of said rings and moving the rings to a discharge point.

2. In a bagle-forming machine, a dough-receiving hopper, means for drawing the dough from said hopper in a sheet and cutting means for severing said sheet into lengths, said severing means comprising a drum, a pair of oppositely-extending knives and means for moving said knives in a circle, said knives being positioned to function as they pass said drum, said drum acting to prevent said sheet from moving away from the knives during the cutting operation, means for forming said lengths into cylindrical members, a rod adapted to receive said cylindrical members, and means for forcing said cylindrical members along said rod, and a plurality of forming disks for forming said cylindrical members into rings while said members are carried by said rod.

3. A bagle-forming machine, including a hopper for receiving a supply of dough, a pair of rollers for drawing said dough from said hopper, said rollers forming the dough into a web as the dough is drawn from the hopper, means for severing said web at regular intervals for forming independent dough sections, forming means positioned to receive said dough sections, said forming means acting to form the respective sections independently into cylindrical members, a rod for receiving said cylindrical members, means for forming said cylindrical members into rings around said rod, and means for smoothing and ejecting said rings immediately after they leave said rod.

4. A bagle-forming machine, including means for receiving a batch of dough, means for causing the dough to move downwardly in the form of a sheet, means for cutting said sheet into sections, an endless conveyor positioned to receive the sections immediately after they are severed from said sheet, a forming mechanism positioned to receive said sections as they are discharged from said conveyor, said forming mechanism acting on the sections independently for forming them into cylindrical members, means arranged adjacent the discharge end of said forming mechanism for bending the cylindrical members into circles and discharge means adapted to receive said members and smooth and complete their circular form.

5. A bagle-forming machine, including a conveyor, means for supplying the conveyor with small batches of dough, forming means for receiving said batches of dough, said forming means acting to form said batches into cylindrical members, a rod having a horizontal section and a vertical section, means for discharging said cylindrical member onto said horizontal section, a pair of forming disks for bending said cylindrical member into substantially a ring, means for forcing said member along said horizontal section to said vertical section, and means adjacent the vertical section for finishing the ring formation of said member, said last-mentioned means acting to discharge said ring from said vertical section.

6. A bagle-forming machine, including a conveyor, means for supplying said conveyor at spaced intervals with batches of dough, a forming mechanism arranged adjacent said conveyor for forming said batches of dough into cylindrical members, said forming mechanism comprising principally a stationary board and a slatted belt for rolling said batches of dough over the board and thereby forming the same into cylindrical members, and means positioned to receive said cylindrical members from said forming mechanism, said last-mentioned means forming the cylindrical members into rings preparatory to cooking.

7. A bagle-forming machine, including a forming structure for forming batches of dough into cylindrical members preparatory to their being formed into rings, said structure including a flat support and an endless forming belt, said forming belt having an endless, articulated structure and a plurality of spaced slats, said slats engaging the batches of dough for rolling them over said support.

8. A bagle-forming machine, including a hopper for receiving a batch of dough, means for dividing said dough into small batches and forming the batches into cylindrical members, a forming rod having a horizontal section and a vertical section, a conveyor for transporting said cylindrical members to the horizontal section of said rod, said cylindrical members being formed with dough of such consistency that the ends will immediately move downwarly under the action of gravity when the center of the cylindrical member strikes the forming rod, thus producing a U-shaped structure, a pusher structure for pushing said U-shaped structure along the horizontal portion of said rod, means for moving the depending ends of said cylindrical member into contact, and means for completing the ring forming operation as the cylindrical member passes along the vertical section of said forming rod.

9. A bagle-forming machine, including a hopper, means for removing small batches of dough from the hopper and forming the same into cylindrical members, a forming rod having a horizontal section and a vertical section, means for transporting and depositing on one end of the horizontal section of said rod the cylindrical members immediately after they have been formed, means for pushing said cylindrical members along said horizontal section to the vertical section, whereby gravity may act to move the cylindrical members downwardly, a pair of forming disks positioned to engage the ends of said cylindrical members as the members move along said horizontal section, said disks acting to press the ends of said cylindrical members together, and means arranged adjacent the vertical section of said rod for completing the forming of the cylindrical members into a ring.

10. A bagle-forming machine, including means for forming small batches of dough into cylindrical members, a forming rod having a horizontal section and a vertical section, said horizontal section being positioned to receive said cylindrical members immediately after being formed, an endless pusher belt formed with arms positioned to engage said cylindrical members and move the cylindrical members along the horizontal section of said rod to the vertical section, means acting on the cylindrical members as they are moved along the horizontal section of said rod for bringing the ends of the cylindrical members together, and constantly moving means arranged adjacent the vertical section of said rod for completing the formation of the ring from said cylindrical members.

11. A bagle-forming machine, including means for forming cylindrical members from small batches of dough, a forming rod positioned to receive said cylindrical members immediately after forming, means for moving said cylindrical members along said rod, means for bringing the ends of said cylindrical members together around said rod, and forming belts arranged adjacent one section of said rod for completing the action of said cylindrical members to form complete ring structures.

LOUIS GENDLER.